March 10, 1970     R. M. QUINN ET AL     3,500,052
ARTICLE PRESENCE-ABSENCE AUTOMATIC MONITORING DEVICE
Filed March 23, 1967     2 Sheets-Sheet 1

INVENTORS:
RICHARD M. QUINN
BY DONNY W. CANDIOTO

Campbell & Harris
ATTORNEYS

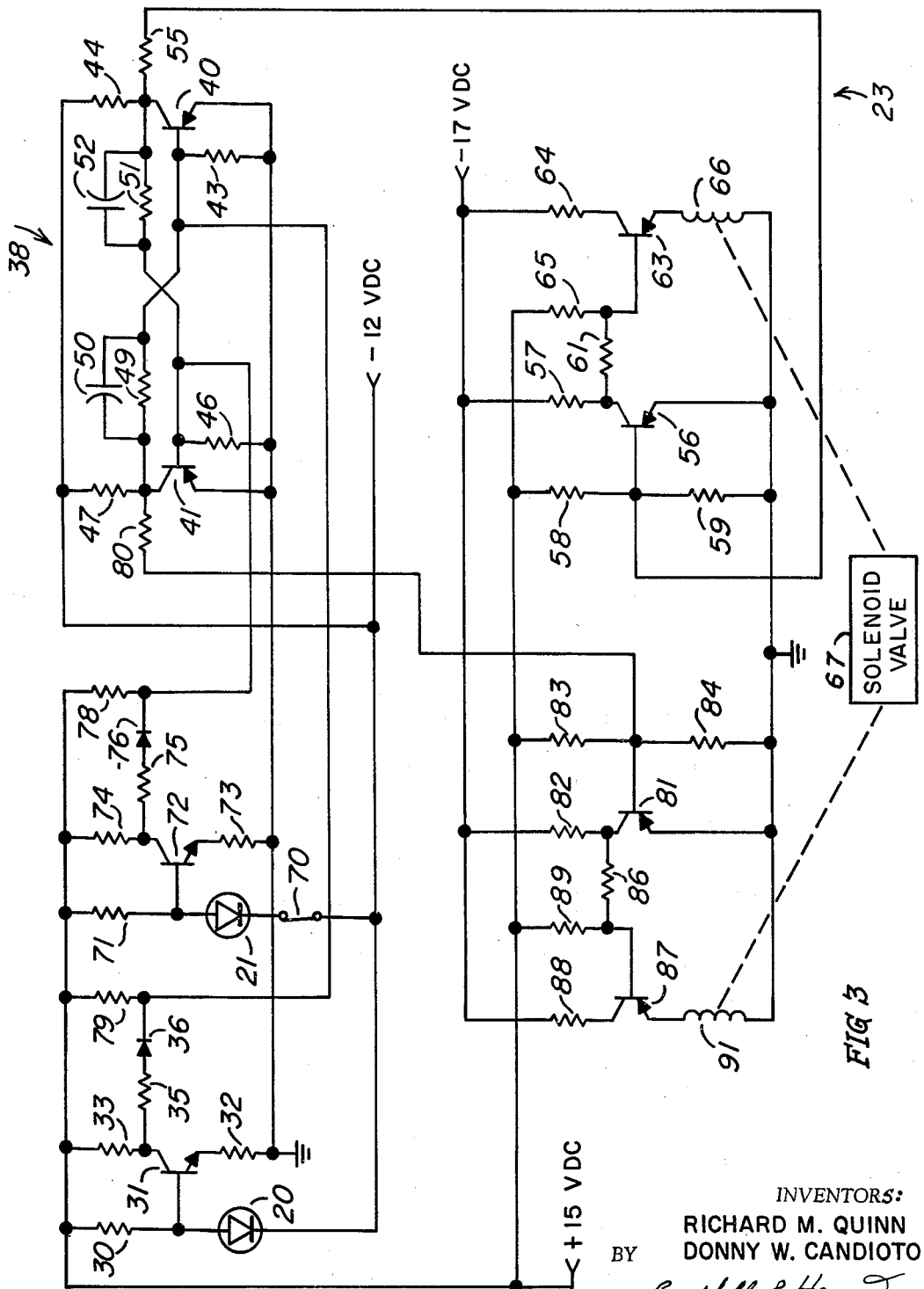

United States Patent Office 3,500,052
Patented Mar. 10, 1970

3,500,052
ARTICLE PRESENCE-ABSENCE AUTOMATIC
MONITORING DEVICE
Richard M. Quinn and Donny W. Candioto, Muncie, Ind.,
assignors to Ball Brothers Company Incorporated,
Muncie, Ind., a corporation of Indiana
Filed Mar. 23, 1967, Ser. No. 625,350
Int. Cl. G06m 7/04; H01j 39/12
U.S. Cl. 250—223                                    7 Claims

ABSTRACT OF THE DISCLOSURE

An electronic device for monitoring presence and absence of a container closure being fed to a work station where gasket material is supplied to form a gasket on the closure. The device includes a photocell to sense the absence of a closure to change the state of a bistable multivibrator so that the output signal precludes supplying of gasket material until after a second photocell senses the absence of a closure at a predetermined later time to cause the bistable multivibrator to re-assume the original state. Timing is achieved by a plate with an aperture therein that is moved along with the closures to mask the photocells except at predetermined timed intervals.

---

This invention relates to an electronic monitoring device, and more particularly to a device for monitoring article presence and absence to preclude work at a work station when an article is absent from said station.

It is well known to provide machines capable of automatically performing one or more manufacturing steps. It is well known, for example, to form a container closure in one or more automatic machines, including, in some cases, the step of forming a gasket on the closure from a gasket material in liquid form, such as a plastisol composition. Since such machines commonly perform work at a fast rate, for example, 500 operations per minute, it is obvious that such machinery can be damaged or at least rendered incapable of further satisfactory performance, if performance of this predetermined work step is attempted when the article itself is not present. In the case of gasket forming material applied to a closure, absence of the closure would cause the material to be deposited on the conveying surface and/or article receptacle at the pour station. This necessitates stopping the machine and cleaning away the gasket material prior to further use of the machine.

While some attempts have been made heretofore to solve this problem, including the extensive use of mechanical apparatus, these devices have not proven to be completely successful due to at least in part, to difficulty of adjustment and/or inability of the machine to handle articles of varying types and operating at varying speeds.

It is therefore an object of this invention to provide an electronic device suitable for monitoring articles to sense presence and absence and preclude work when an article is absent from a work station.

It is another object of this invention to provide an electronic monitoring device capable of sensing the absence of a container closure being moved toward a pour station and precluding pouring of gasket material at the pour station whenever a closure is not present at said station.

It is still another object of this invention to provide an electronic monitoring device having a pair of photocells, one of which causes a bistable multivibrator to assume a first state when absence of an article is sensed to thereby preclude work at a work station, and the other of which causes the bistable multivibrator to re-assume its original state at a predetermined later time to thereafter permit performance of work at said station.

It is yet another object of this invention to provide an electronic monitoring device having a movable plate with an aperture therein positioned between an article path and a light source whereby said movable plate permits light passage in timed succession to first and second photocells, the outputs of which are used to preclude performance of work at a work station whenever an article is not fed to said station.

With these and other objects in view, which will become apparent to one skilled in the art as the description proceeds, this invention resides in the novel construction, combination and arrangement of parts substantially as hereinafter described, and more particularly defined by the appended claims, it being understood that such changes in the precise embodiment of the hereindisclosed invention are meant to be included as come within the scope of the claims.

The accompanying drawings illustrate two complete embodiments of the invention according to the best mode so far devised for the practical application of the principles thereof, and in which:

FIGURE 3 is a schematic diagram of the electronic signal processing circuitry of this invention.

Figure 1:
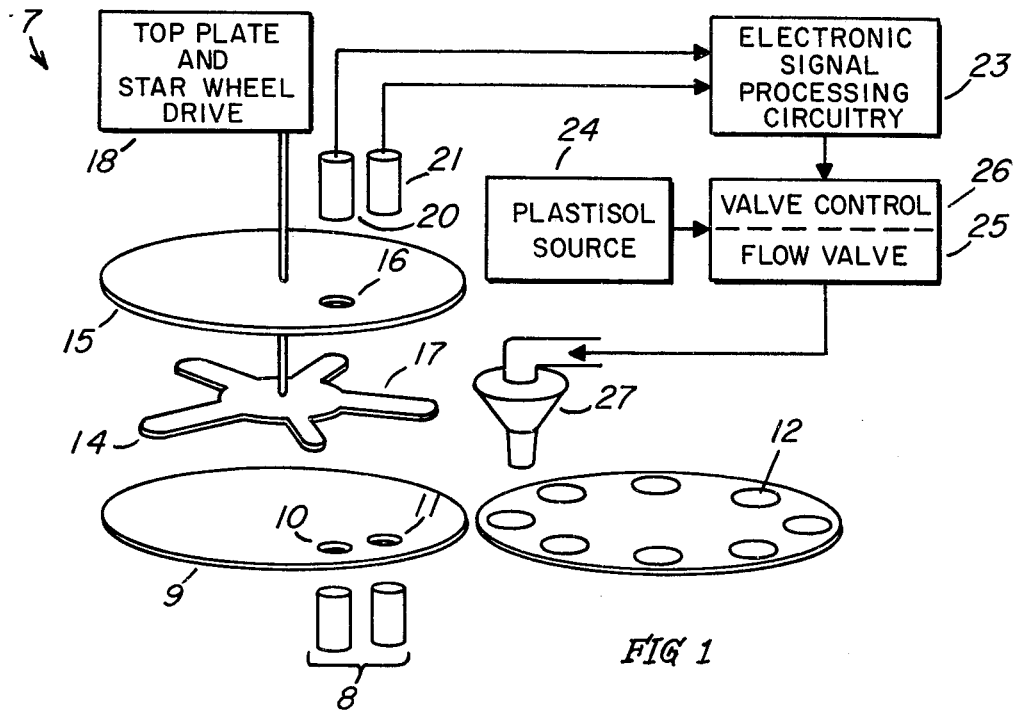
FIGURE 1 is a partial block diagram illustrating typically the monitoring device of this invention used with a rotary feeding mechanism.

Referring now to the drawings in which like numerals have been used for like characters throughout, the numeral 7 refers generally to the electronic monitoring device of this invention, which, as shown in FIGURE 1, includes a light source 8 (which may include, if desired, a plurality of specified light sources for better light distribution), which light source is positioned below bottom plate 9 having a pair of spaced apertures 10 and 11 therein.

The monitoring device is intended to monitor articles as they are passed, or fed, from a supply conveyor or the like (not shown) to a work station, such as a pour station 12 where gasket material in liquid form is deposited on a container closure (the article, in this case). As shown in FIGURE 1, articles may be fed to pour station 12 along fixed bottom plate 9 by means of a star wheel 14 having a top plate 15 thereabove (an exploded view of these elements being shown for simplicity). Top plate 15 has a series of apertures 16 therein aligned with each pocket 17 of star wheel 14, said star wheel being of a size to receive a closure in each pocket. Preferably top plate 15 is a disc constrained to rotation with star wheel 14, as shown in FIGURE 1, with the star wheel serving as an actuator to feed the closures to pour station 12. Star wheel 14 and top plate 15 may be conventionally driven, as by top plate and star wheel drive 18.

Since bottom plate 9 has only two apertures therein, each aperture of top plate 15 (each being aligned with a pocket of star wheel 14) is first aligned with aperture 10 of bottom plate 9 and then aperture 11 once during each revolution of the disc. Thus, if no article is in the pocket, light from source 8 will pass through the aperture in the aligned top and bottom plates and be received by photocells 20 and 21 positioned above the top plate. The outputs from which photocells 20 and 21 are coupled to electronic signal processing circuitry 23, the output of which is utilized to preclude work performance if absence of an article is sensed.

Pour station 12 may be conventional and, as indicated in FIGURE 1, may include a gasket material supply source 24, the flow from which is conventionally controlled by a flow valve 25 which is in turn controlled in conventional fashion by a control device 26.

As is well known in the art, gasket material may be deposited on a closure in liquid form by rotating the closure or the gasket material nozzle 27 with the flow valve opened only long enough to deposit the desired gasket material on each closure while it is at the pour station. The control device can be, for example, a cam operated mechanism (not shown) that turns the valve on at the desired point and off again at the desired later point during each revolution of each closure and/or of the nozzle.

It is to be appreciated, of course, that the articles could be other than closures and that the work step to be performed at the work station could be other than the pouring of gasket material, the essential features being that an article is transported to a work station for work to be automatically performed at said station.

As shown in FIGURE 1, photocell 20 provides an output signal due to receipt of light from source 8 only when aperture 16 of top plate 15 is aligned with aperture 10 in bottom plate 9. If, however, a closure is in the pocket 17 of star wheel 14, no light passes to photocell 20 even when apertures 10 and 16 are aligned, and accordingly, no output is produced from photocell 20. If, however, no closure is in pocket 17 of star wheel 14, light from source 8 will pass through aperture 10 and aperture 16, when they are aligned, and light will be received by photocell 20 from light source 8. This will cause photocell 20 to produce an output.

In like manner, when the movable, of top, plate 15 is rotated to a point where aperture 16 of top plate 15 is aligned with aperture 11 of bottom plate 9, then photocell 21 will receive light from source 8 and will produce an output (unless a closure is in the pocket to block the light path).

As can be seen from FIGURE 1, photocell 20 will receive light from source 8 timewise prior to receipt of light by photocell 21 when no closure is in the pocket and the amount of time between these two events depends upon the speed of movement of top plate 15.

Figure 2:
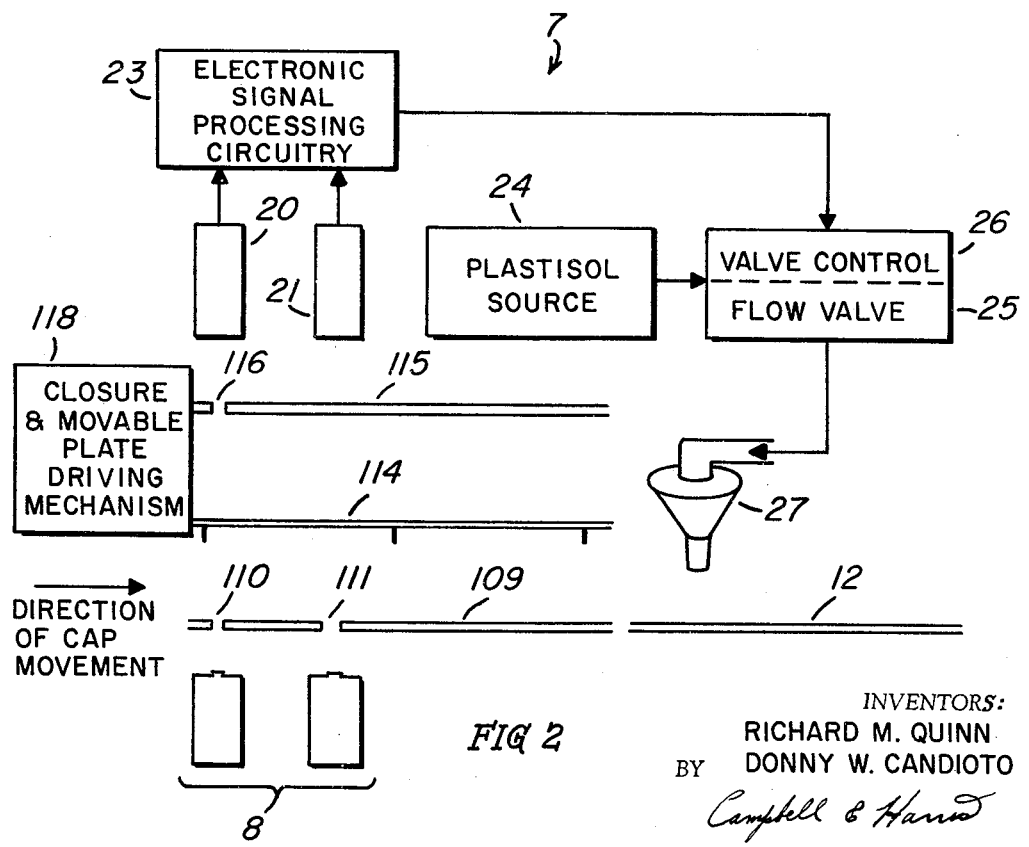
FIGURE 2 is a partial block diagram illustrating the monitoring device of this invention used with a straight conveyor feeding mechanism.

FIGURE 2 illustrates a second embodiment of the invention that could be utilized where a straight feed conveys the article to the work station, rather than a rotary type feed, as illustrated in FIGURE 1. In this case, top plate 115 having aperture 116 must be cause to move in the direction of article movement by closure and movable plate 114 and driving mechanism 118 to unmask first photocell 20 and then photocell 21 in timed sequence. The top plate can then be repositioned, as by fast flyback, for example, for monitoring the next succeeding article being fed to the work station 12 across bottom plate 109 having apertures 110 and 111 therein.

FIGURE 3 illustrates the electronic circuitry of the monitoring device. Photocell 20 is directly connected at one side to a −12 volt DC power supply (not shown) and connected at the other side through resistor 30 to a +15 volt DC power supply (not shown), and directly to the base of transistor 31, which transistor has its emitter connected to ground through resistor 32 and its collector connected to the +15 volt DC power supply through resistor 33.

The output from amplifier 31 is taken from the collector through series connected resistor 35 from diode 36 to bistable multivibrator 38. Bistable multivibrator 38 includes a pair of transistors 40 and 41 with the input from transistor 31 being coupled to the base of transistor 40. The base of transistor 40 is connected to ground through resistor 43, the emitter is directly connected to ground, and the collector is connected to the −12 volt DC power supply through resistor 44.

In like manner, the base of transistor 41 is connected to ground through resistor 46, the emitter is directly connected to ground, and the base is connected to the −12 volt DC power supply through resistor 47. Cross coupling between transistors 40 and 41 is accomplished by means of parallel connected resistor 49 and capacitor 50 connected between the collector of transistor 41 and the base of transistor 40, and parallel connected resistor 51 and capacitor 52 connected between the collector of transistor 40 and the base of transistor 41.

The article absence indicating output from bistable multivibrator 38 is taken through resistor 55 to the base of transistor 56. Transistor 56 has its emitter directly connected to ground, its base connected to a −17 volt DC power supply (not shown) through resistor 57, and its base connected to the junction of a voltage divider consisting of series connected resistors 58 and 59 connected between the +15 volt DC power supply and ground.

The output from amplifier 56 is coupled through resistor 61 to the base of transistor 63. This transistor has its collector connected to the −17 volt DC power supply through resistor 64 and its base connected to the +15 volt DC power supply through resistor 65.

The emitter of transistor amplifier 63 is connected to ground through coil 66 of solenoid valve 67. Solenoid valve 67 is utilized to preclude the work step at the work station when the valve is at the position assumed when coil 66 is de-energized. This can be accomplished, for example, by a toggle switch (not shown) actuated by valve 67 which prevents the cam of the valve control from opening the pour valve.

Photocell 21 is likewise connected on one side to the −12 volt DC power supply, except that photocell 21 may be connected, if desired, through an operate switch 70 which can be opened to prevent the bistable multivibrator from constantly changing state if it is desirable to operate the machine without articles being passed therethrough for any purpose. The opposite side of photocell 21 is connected to the +15 volt DC power supply through resistor 71 and to the base of transistor 72. Transistor amplifier 72 has its emitter connected to ground through resistor 75 and its collector connected to the +15 volt DC power supply through resistor 74. The output from transistor 72 is coupled through series connected resistor 75 and diode 76 to the base of transistor 41 of bistable multivibrator 38. In addition, the bases of transistors 40 and 41 are connected to the +15 volt DC power supply through resistors 78 and 79, respectively. The output from photocell 21 causes bistable multivibrator 38 to re-assume its original state.

The second output from bistable multivibrator 38 is taken through resistor 80 to the base of transistor 81. Transistor 81 has its collector connected to the −17 volt DC power supply through resistor 82, its emitter connected directly to ground, and its base connected to the junction of series connected resistors 83 and 84, which resistors are connected between the +15 volt DC power supply and ground. The output from amplifier 81 is coupled through resistor 86 to the base of transistor 87. Transistor 87 has its collector connected to the +15 volt DC power supply through resistor 88 and its base connected to the +15 volt DC power supply through resistor 88 and its base connected to the +15 volt DC power supply through resistor 89.

The emitter of transistor 87 is connected to ground through coil 91 of solenoid valve 67. Coil 91 is therefore energized at the same time that coil 66 is deenergized. In like manner, when coil 91 is de-energized, coil 66 is energized to permit the flow valve to be opened for normal operation of the device.

An illustrative list of components for the electronic circuitry as described hereinabove is as follows:

20, photocell—LS 400; 21, photocell—LS 400; 30, resistor—4.7K; 31, transistor—2N388; 32, resistor—100; 33, resistor—470; 35, resistor—330; 36, diode—1N458; 40, transistor—2N525; 41, transistor—2N525; 43, resistor—4.7K; 44, resistor—150; 46, resistor—4.7K; 47, resistor—150; 49, resistor—220; 50, capacitor—.01 μfd.; 51, resistor—220; 52, capacitor—.01 μfd.; 55, resistor—68; 56, transistor—2N1534; 57, resistor—75; 58, resistor—1K; 59, resistor—15K; 61, resistor—5; 63, transistor—

2N1553; 64, resistor—5; 65, resistor—3.3K; 71, resistor—4.7K; 72, transistor—2N388; 73, resistor—100; 74, resistor—470; 75, resistor—330; 76, diode—1N458; 78, resistor—15K; 79, resistor—15K; 80, resistor—68; 81, transistor—2N1534; 82, resistor—75; 83, resistor—1K; 84, resistor—15K; 86, resistor—5; 87, transistor—2N1553; 88, resistor—5.

In operation (device of FIGURE 1), when a closure is present in the star wheel pocket, light is precluded from reaching photocells 20 and 21 even when the apertures in the top and bottom plates are aligned with one another. At this time presence of a closure is therefore sensed and normal pouring of gasket material at a pour station is therefore permitted.

If no closure is present in the star wheel pocket, however, then photocell 20 receives light from source 8 when the aperture in the top plate is aligned with aperture 10 in the bottom plate. This causes an output signal to be produced by transistor 31, which signal is coupled to the base of transistor 40 of bistable multivibrator 38 to switch the bistable multivibrator so that an output is produced from the collector of transistor 40 and no output from the collector of transistor 41. The incoming signal causes transistor 40 to be nonconductive to produce the signal output that causes transistor 56 to be conductive and thereby cause transistor 63 to be nonconductive to thus cause de-energization of coil 66. Since transistor 41 was at the same time caused to be conductive when the output was received from photocell 20, transistor 81 was caused to be nonconductive which in turn caused transistor 87 to be conductive to thus energize coil 91 of solenoid valve 67. Pouring of gasket material is thus precluded.

When the top plate has moved a sufficient distance to cause alignment of aperture 16 in the top plate with aperture 11 in the bottom plate, passage of light to photocell 21 is permitted, and an output signal is coupled from transistor 72 to the base of transistor 41 to cause bistable multivibrator 38 to re-assume its original state. This results in energization of coil 66 and de-energization of coil 91 to thereafter permit pouring of the gasket material at the pour station.

It can be seen that the monitoring device of this invention provides a dependable means for sensing presence and absence of an article to thereby control work performance at a work station. It has been found that operation at a speed approaching 500 operations per minute enables the sensing elements to be placed in the feed portion of the device without requiring any delay electronics or the like.

What is claimed is:

1. An automatic monitoring device for a machine having a controlled work performing element at a work station, actuating means for moving articles in a predetermined path to said work station, and control means for controlling the work performance of said element, said monitoring device comprising: sensing means for sensing presence and absence of an article; a plate having at least one portion through which article sensing is effected to thereby control article sensing as said article is moved toward said work station by said actuating means; electronic means responsive to said controlled article sensing by said sensing means for determining article presence and permitting work to be performed when an article is present at said work station, and effectively disabling said control means to preclude performance of work when no article is present at said work station; and second sensing means connected to said electronic means, sensing by said second sensing means being effected through said plate so that further performance of work by said work performing element is enable after a predetermined period of time following article absence sensing by said first mentioned sensing means.

2. The monitoring device of claim 1, wherein said articles are container closures, wherein said first and second mentioned sensing means include light means and first and second photocells, respectively, wherein said portion of said plate is an aperture and wherein said plate and closure path are between said photocells and said light means, wherein absence of a closure being moved to a work station causes said first mentioned sensing means to produce an output signal, wherein said electronic means includes a bistable multivibrator that is caused to change states when an output signal is received from said first mentioned sensing means to thereby preclude performance of work by said work performing element, and wherein said second photocell produces an output signal when absence of a closure is sensed subsequent to sensing by said first mentioned sensing means, said output signal from said second sensing means causing said bistable multivibrator to assume its original state a predetermined time after being caused to change states by an output signal from said first mentioned sensing means.

3. An automatic monitoring device for a machine having a valve controlling flow of gasket material to a container closure to form a gasket thereon at a pour station, an actuator for moving closures to said pour station, and automatic valve control means for operating said valve, said monitoring device comprising: a top plate positioned above the path of said closures being moved toward said pour station, said top plate having at least one aperture therein; first and second sensing means including a light source and first and second photocells, respectively, said light source and photocells having said top plate and closure path therebetween; driving means for causing movement of said top plate relative to said first and second sensing means so that said first and second photocells are sequentially exposed to said light source at predetermined different times; said first photocell sensing absence of a closure being moved toward said pour station and producing an output signal in response thereto when said first photocell is exposed to said light source through the aperture in said top plate; a bistable multivibrator that is caused to assume a predetermined state when an output signal is received from said first photocell to produce an absence indicating output signal; and a blocking element for precluding flow of gasket material in response to an absence indicating output signal from said bistable multivibrator; said second photocell being exposed to said light source through the aperture in said top plate to sense absence of a closure being moved toward said pour station at a time subsequent to sensing by said first sensing means, said second sensing means producing an output signal that causes said bistable multivibrator to assume the state opposite to that of said predetermined state to thereby thereafter permit said valve control means to control flow of gasket material.

4. The monitoring device of claim 3 further characterized by: a bottom plate over which said closures are moved toward said pour station, said bottom plate having first and second apertures above said light source to permit light passage upwardly therethrough toward said first and second photocells, said top plate above the path of said closures blocking light from said bottom plate apertures to said photocells except through said aperture therein.

5. The monitoring device of claim 4 wherein said actuator is a star wheel and wherein said top plate is a disc that rotates with said star wheel and has an aperture aligned with each pocket of said star wheel.

6. The monitoring device of claim 4 wherein said top plate and said closures are driven by said actuator so that the aperture on said top plate and said closures follow a predetermined substantially straight path so that said aperture and each said closure is in the light path to said first photocell timewise prior to being in the light path of said second photocell.

7. In a device for pouring gasket material onto a container closure, the combination of: a valve controlling flow of gasket material to a container closure at a pour station; valve control means for automatically operating said valve to control the flow of gasket material to a closure; a star wheel for moving closures toward said pour station; a bottom plate over which said closures are moved by said star wheel, said bottom plate having a pair of spaced apertures therein; a top plate constrained to rotation with and above said star wheel, said top plate having an aperture therein above each pocket of said star wheel; light source means below said bottom plate such that light passes upwardly through each of said apertures in said bottom plate; first and second photocells above said top plate, said photocells being positioned to receive light from said light source only when said apertures in said top and bottom plates are aligned and no closure blocks the lighted path therebetween, whereby each said aperture in said top plate permits light passage to said first and second photocells in timed sequence when no closure is present in the pocket of said star wheel aligned with said apertures in said top and bottom plates; a bistable multivibrator for receiving the signals from said photocells, said multivibrator being caused to assume a first state when a signal is received from said first photocell and caused to assume the opposite state when a signal is received from said second photocell, said multivibrator producing a closure absence indicating output when set to said first state; and blocking means responsive to said closure absence indicating output to preclude flow of gasket material until said multivibrator is caused to assume the opposite state due to receipt of a signal from said second photocell.

References Cited
UNITED STATES PATENTS

| | | | |
|---|---|---|---|
| 2,789,589 | 4/1957 | Fechheimer | 141—141 |
| 3,139,915 | 7/1964 | Minard | 250—223 X |
| 3,218,463 | 11/1965 | Calhoun | 250—222 |
| 3,253,126 | 5/1966 | Baughman | 250—223 X |
| 3,322,023 | 5/1967 | Rottman | 250—223 X |

RALPH G. NILSON, Primary Examiner

C. M. LEEDOM, Assistant Examiner

U.S. Cl. X.R.

141—141